(12) United States Patent
Nam

(10) Patent No.: US 6,207,319 B1
(45) Date of Patent: Mar. 27, 2001

(54) CAP ASSEMBLY FOR SECONDARY BATTERY

(75) Inventor: Sang-Kwon Nam, Chungchongnam-do (KR)

(73) Assignee: Samsung Display Devices Co., Ltd. (KR)

( * ) Notice: Subject to any disclaimer, the term of this patent is extended or adjusted under 35 U.S.C. 154(b) by 0 days.

(21) Appl. No.: 09/293,311

(22) Filed: Apr. 16, 1999

(30) Foreign Application Priority Data

Sep. 10, 1998 (KR) .................................................. 98-37385

(51) Int. Cl.[7] .................................................... H01M 2/00
(52) U.S. Cl. ........................ 429/163; 429/175; 429/185; 429/57; 429/176
(58) Field of Search ................................ 429/57, 65, 163, 429/164, 174, 185, 175, 176, 178, 180, 186

(56) References Cited

U.S. PATENT DOCUMENTS

| | | | |
|---|---|---|---|
| 4,670,362 | * 6/1987 | Wiacek et al. | .................... 429/174 |
| 5,080,985 | * 1/1992 | Wiacek et al. | .................... 429/172 |
| 6,025,090 | * 2/2000 | Sargeant et al. | .................... 429/163 |
| 6,042,967 | * 3/2000 | Sargeant et al. | .................... 429/164 |
| 6,127,062 | * 10/2000 | Sargeant et al. | .................... 429/53 |

* cited by examiner

Primary Examiner—Stephen Kalafut
Assistant Examiner—Raymond Alejandro
(74) Attorney, Agent, or Firm—Baker & McKenzie

(57) ABSTRACT

A cap assembly for a secondary battery having a cap containing an electrolyte and an electrode assembly. The cap assembly is mounted on an upper end of the can with a gasket disposed between the cap assembly and the can. The cap assembly includes a cap cover, a current collector disposed under the cap cover, a cap plate disposed under the current collector, a circuit break disk welded on the cap plate, and an insulator disposed between the cap plate and the circuit break disk. The cap plate is provided with a safety groove and a indented projection outside the safety groove. The projection is tightly disposed between the gasket and the insulator so as to fixedly support the insulator.

3 Claims, 4 Drawing Sheets

CAP ASSEMBLY FOR SECONDARY BATTERY

BACKGROUND OF THE INVENTION

1. Field of the Invention

The present invention relates to a secondary battery and, more particularly, to a cap assembly for a secondary battery which can enhance a seal effect and prevent electrolyte from leaking.

2. Description of the Prior Art

Generally, secondary batteries are rechargeable and compact in size, and yet has a large capacity. Well known as secondary batteries are a nickel metal hydride battery, a lithium battery, and a lithium ion(Li-ion) battery.

Particularly, the Li-ion battery uses lithium metal oxide as a positive active material and carbon or a carbon compound as a negative active material. Lithium salt dissolved in an organic solvent is used as the electrolyte via which the lithium ions move between positive and negative electrodes.

Charging and discharging operations are realized while the lithium ions are moved between positive and negative electrodes.

FIG. 5 shows a conventional Li-ion battery.

A rolled electrode assembly 1 is inserted into a can 12 filled with electrolyte, the rolled electrode assembly 1 consisting of positive and negative electrodes and a separator disposed between the positive and negative electrodes. Mounted on an upper end of the can 12 is a cap assembly 2.

The cap assembly 2 is insulated from the can 12 by an intermediate gasket 18. That is, the upper end of the can 12 is crimped on the outer periphery of the cap assembly 2 with the gasket 18 interposed therebetween.

The cap assembly 2 comprises a plate 10 provided with a safety groove 8, a current control member 6 disposed on the plate 10, and a cap cover 4 disposed on the current control member 12. Welded under the central portion of the plate 10 is a circuit breaker 16 with an insulator 14 disposed therebetween. The gasket 18 is down-skirted and crimped under the periphery of the insulator 14.

The central portion of the plate 10 that is welded to the circuit breaker 16 serves the function of disconnecting a flow of the current when internal pressure of the battery is increased and of discharging gas generated within the battery due to an abnormal chemical reaction.

To realize this, the safety groove 8, which is mechanically weak, is formed when casting the plate 10 so that, when internal pressure is overly increased, the plate can be broken at a portion where the safety groove 8 is formed.

However, although the upper end of the can 12 is crimped on a periphery of the cap assembly, since tiny gaps may be formed between the parts constituting the cap assembly, the electrolyte may be leaked through the gaps during the charging and discharging operations of the battery.

In addition, the cap assembly 2 is assembled by first forming the plate 10 using a press working process. After forming the plate, the circuit breaker 16 is first welded to the plate 10, then, after interposing the insulator 14 between the plate 10 and the circuit breaker 16, down-skirted under the periphery of the insulator 14. This causes the manufacturing process to be complicated, decreasing productivity.

SUMMARY OF THE INVENTION

Therefore, the present invention has been made in an effort to solve the above described problems.

It is an objective of the present invention to provide a cap assembly or a secondary battery, which can enhance a seal effect of the battery and be easily assembled to improve manufacturing productivity.

To achieve the above objective, the present invention provides a cap assembly for a secondary battery having a can containing an electrolyte and an electrode assembly, the cap assembly mounted on the upper end of the can with a gasket disposed between the cap assembly and the can.

The cap assembly comprises a cap cover, a current control member disposed under the cap cover, a cap plate disposed under the current control member, a circuit break disk welded on the cap plate, and an insulator disposed between the cap plate and the circuit break disk.

The cap plate is provided with a safety groove and an indented projection outside the safety groove. The projection is tightly disposed between the gasket and the insulator so as to fixedly support the insulator.

The projection exerts more pressure toward the gasket than otherwise so that air-tightness between the cap plate and the upper end of the can. An indention in the projection serves as a guide groove.

According to a feature of the present invention, the projection comprises a ring-shaped projection formed on a bottom surface of the cap plate.

According to another feature of the present invention, the projection comprises a plurality of point projections formed along a circular direction on a bottom surface of the cap plate.

BRIEF DESCRIPTION OF THE DRAWINGS

The accompanying drawings, which are incorporated in and constitute a part of the specification, illustrate an embodiment of the invention, and, together with the description, serve to explain the principles of the invention:

FIG. 4b is a sectional view taken along line A—A in FIG. 4a; and

DETAILED DESCRIPTION OF PREFERRED EMBODIMENT

Figure 1:
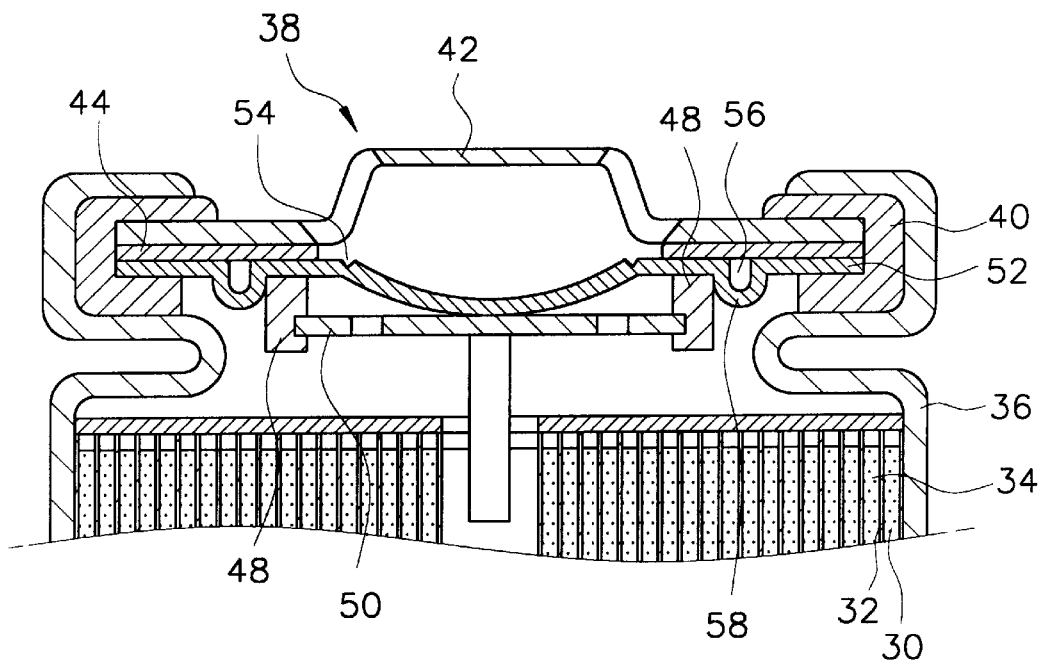
FIG. 1 is a partial sectional view of a secondary battery where a cap assembly according to a preferred embodiment of the present invention is applied.

Description will now be made in detail to a preferred embodiment of the present invention, which is illustrated in the accompanying drawings FIG. 1 shows a secondary battery where a cap assembly according to a preferred embodiment of the present invention is employed.

The secondary battery comprises a can 36 containing a rolled electrode assembly having a negative electrode 34, a positive electrode 30 and a separator 32 between them.

The inventive cap assembly 38 is mounted on the upper end of the can 36 and electrically coupled to the positive electrode 30. The upper end of the can 36 is air-tightly crimped on a periphery of the cap assembly 38 with a gasket 40 disposed therebetween.

The cap assembly 38 comprises a cap cover 42, a current control member 44 disposed under the cap cover 42, and a cap plate 52 disposed under the current control member 44.

The cap plate 52 comprises a circuit break disk 50 welded on the central portion of the cap plate 52, and an insulator 48 disposed between the cap plate 52 and the circuit break disk 50. That is, the central portion of the cap plate 52 is concaved downward to define a dome 57 upside down and the circuit break disk 50 is welded to the top of the dome 57.

The cap plate 52 is provided with a safety groove 54 formed around the dome 57 and an indented projection 58 outside the safety groove 54. The projection 58 is tightly disposed between the gasket 40 and the insulator 48 so as to fixedly support the insulator 48.

The projection 58 exerts more pressure toward the gasket 40 than otherwise so that air-tightness between the cap plate 52 and the upper end of the can 12. It reduces leakage of the electrolyte. An indention in the projection 58 serves as a guide groove 56.

Figure 2A:
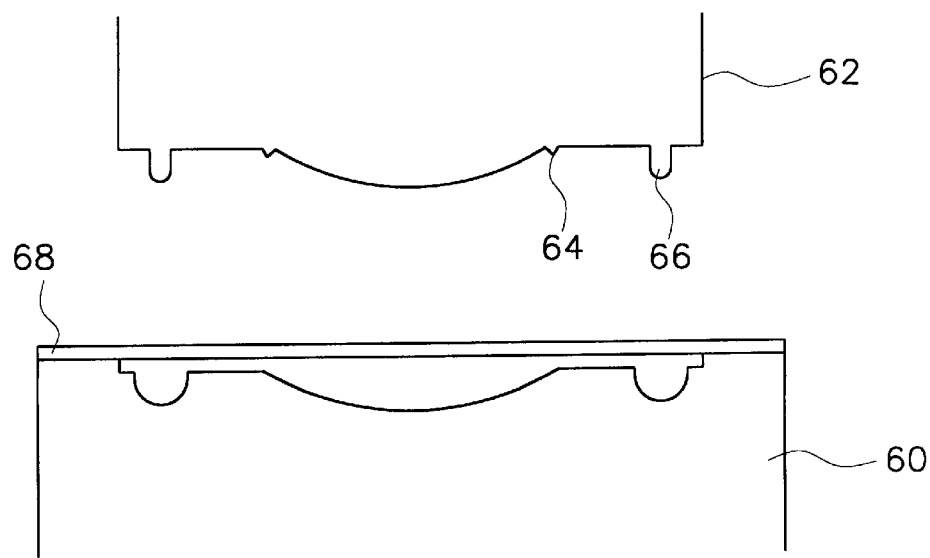
FIGS. 2a and 2b are schematic views illustrating sequential processes for forming a cap plate depicted in FIG. 1.
Figure 2B:
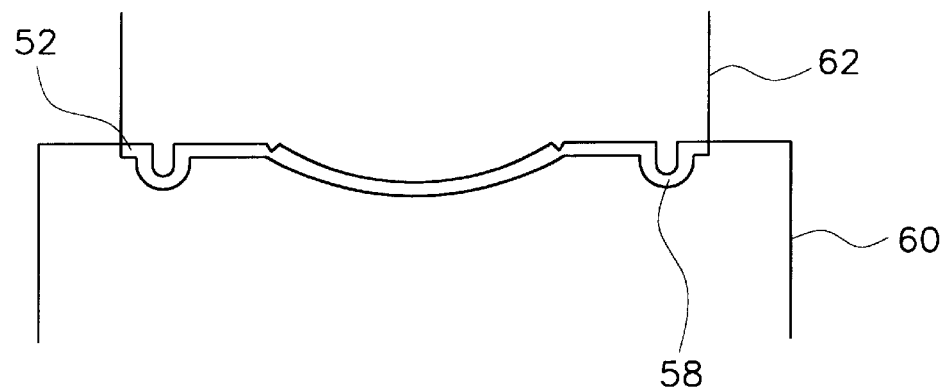

FIGS. 2a and 2b show sequential processing steps for forming the cap plate 52.

First, a punch 62 provided with a projection 64 for forming the safety groove 54 and a projection 66 for forming the guide groove 56 and the projection 58 are mounted on a press machine (not shown). A plate 68 is disposed on a die 60, then pressed by the press machine to form the safety groove 54, the guide groove 56, and the projection 58.

Figure 3:
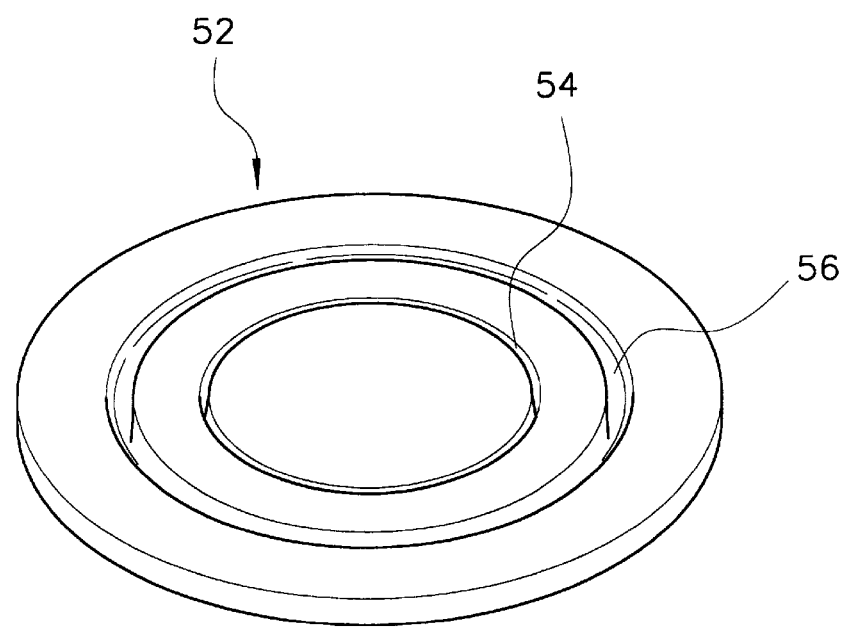
FIG. 3 is a perspective view of a cap plate according to a first embodiment of the present invention.

FIG. 3 shows a cap plate according to a first embodiment of the present invention.

As shown in the drawing, the guide groove 56 is circular, and formed at a predetermined distance between the periphery of the cap plate 52 and the safety groove 54 such that the indented projection 58 is also ring-shaped and extended downward.

Figure 4A:
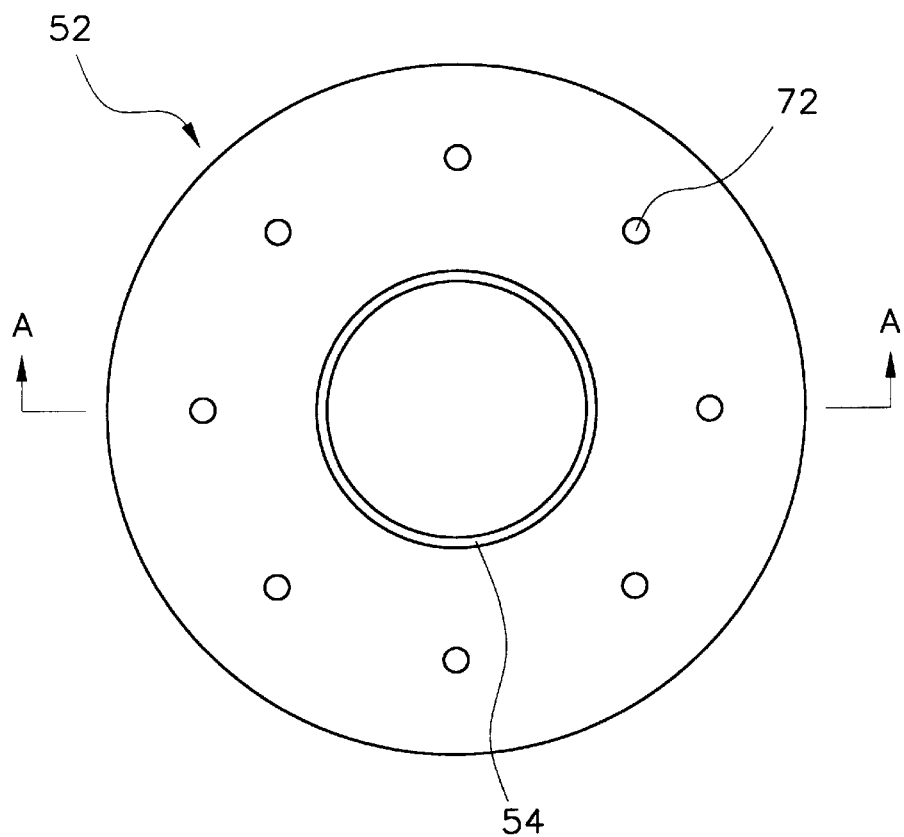
FIG. 4a is a plane view of a cap plate according to a second embodiment of the present invention.
Figure 4B:
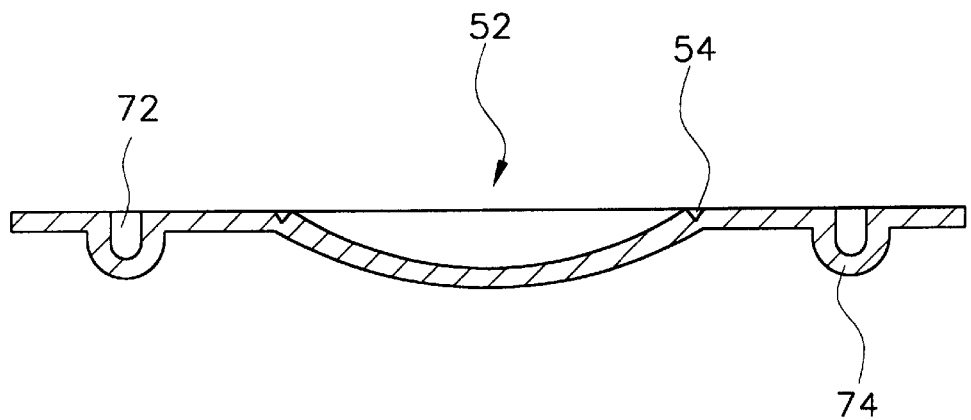
Figure 5:
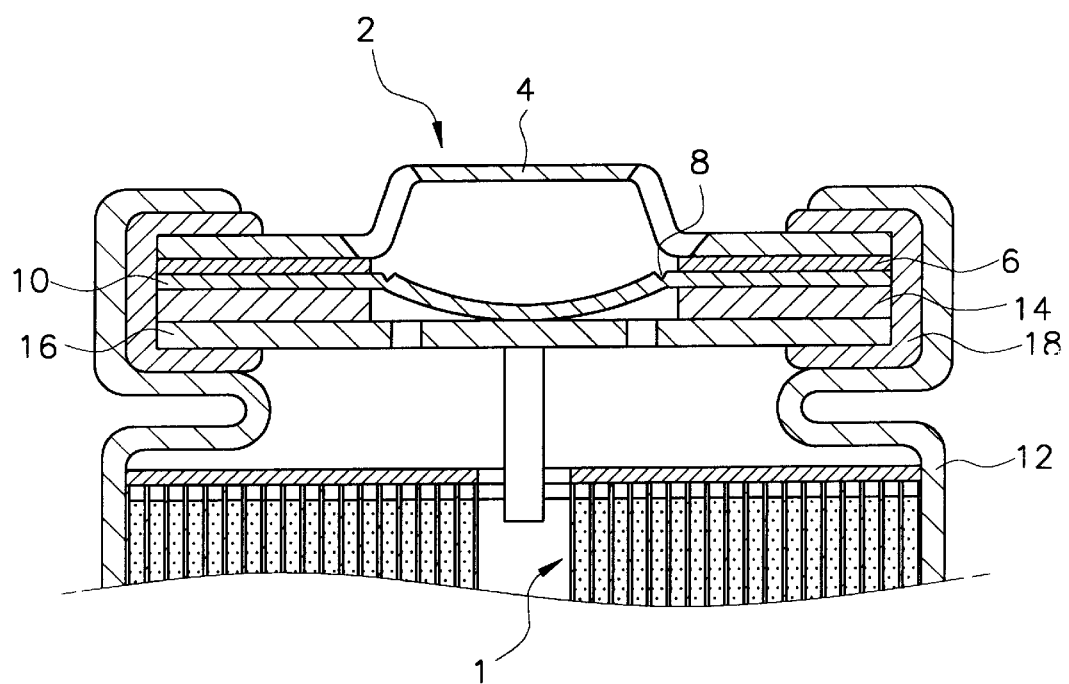
FIG. 5 is a partial sectional view of a secondary battery where a conventional cap assembly is employed.

FIGS. 4a and 4b show a cap plate according to a second preferred embodiment of the present invention.

In this embodiment, instead of providing the ring-shaped projection 58, a plurality of point projections 74 and grooves 72 are formed along a circumference of the cap plate 52 between the periphery of the cap plate 52 and the safety groove 54 such that the point projections 74 are tightly disposed between the gasket 40 and the insulator 48. The function of the point projections 74 in this embodiment is the same as that of the first embodiment. The projection(s) 74 formed under the cap plate 52 serves to fixedly support the insulator 48 and increases the contact area with the gasket 40.

While this invention has been described in connection with what is presently considered to be the most practical and preferred embodiment, it is to be understood that the invention is not limited to the disclosed embodiments, but, on the contrary, is intended to cover various modifications and equivalent arrangements included within the spirit and scope of the appended claims.

What is claimed is:

1. A cap assembly for a secondary battery having a can containing an electrolyte and an electrode assembly, the cap assembly mounted on the upper end of the can with a gasket disposed between the cap assembly and the can, comprising:

a cap cover;

a current collector disposed under the cap cover;

a cap plate disposed under the current collector;

a circuit break disk welded on the cap plate; and an insulator disposed between the cap plate and the circuit break disk;

wherein the cap plate is provided with an indented projection at a predetermine area to fixedly support the insulator.

2. The cap assembly of claim 1 wherein the indented projection comprises a ring-shaped projection formed on a bottom surface of the cap plate.

3. The cap assembly of claim 1 wherein the indented projection comprises a plurality of point projections on a bottom surface of the cap plate.

* * * * *